3,316,118
MIXED RESIN ADHESIVE COMPOSITION FOR SECURING HYDROPHOBIC CALCIUM TUNGSTATE SALT LAYER TO HYDROPHILIC BASE
Peter A. Landskroener, Binghamton, N.Y., assignor to General Aniline & Film Corporation, New York, N.Y., a corporation of Delaware
No Drawing. Filed Nov. 29, 1963, Ser. No. 327,061
6 Claims. (Cl. 117—33.5)

The present invention relates to an adhesive composition for securing a salt layer to base sheet material. It has particular application to compositions which are especially adapted for use as adhesive layers between suitable photographic support sheets such as papers or films and overlying salt layers.

A typical salt layer for use in photographic applications may comprise a material such as calcium tungstate together with a suitable polymeric binder. Other salts, organic or inorganic, may be added or substituted. These salt layer materials are used for various purposes, including intensifying screen layers, and their adhesion to the usual photographic supports has sometimes been difficult to accomplish in the past.

According to the present invention, a combination of adhesive materials has been found which is more effective and more suitable for the particular type of use just mentioned than the analogous compositions known in the prior art.

For example, as a surface for an intensifying screen for use in certain branches of photography, it is desirable to have a flexible support of fabric such as cloth, paper, or the like, which carries a salt layer comprising a binder and a salt material such as calcium tungstate. A typical calcium tungstate layer is made up of a combination of calcium tungstate, a resinous binder such as polyvinyl acetate or polyvinyl chloride, or a combination thereof, a small amount of solvent for the resin, and a flexibilizer or plasticizer of a suitable type to maintain flexibility of the resin binder on the flexible support; for the latter, a conventional alkyl phthalate such as dioctyl phthalate or one of its equivalents is quite suitable. This composition of course, can have other binders, plasticizers, solvents, or other modifiers as may be needful.

To cause a composition such as just described to adhere firmly and soundly to a paper or fabric base, or even more so to a film base, has often proved to be very difficult in the past. It is desirable also that the adhesive layer function as a sealer against moisture or other materials which would tend to cause the screen structure to degrade. According to the present invention, however, a novel combination of ingredients is effective to make a very suitable adhesive composition and sealer for applications of the type just described. This combination of ingredients includes a polycarbonate resin and a copolyester of a plurality of dibasic acids.

One of the ingredients which is found to be very desirable for the present purpose involves a phthalate copolyester. Such esters, per se, have been suggested, for example, as adhesive materials which are quite effective for adhering unlike materials to surfaces of fabrics, resinous films and the like. A composition based on this ingredient is described in U.S. Patent 2,892,747. It is also suggested in certain earlier patents in general terms. This ingredient is one, but only one, of the materials preferably used in applicant's invention. It can be varied somewhat, but preferably involves esters of dibasic aromatic acids combined with some alicyclic dicarboxylic acids. A typical composition for this one ingredient may include the copolymerized esters of terephthalic acid with esters of isophthalic acid and esters of one or more non-aromatic dibasic acids, such as adipic acid and/or sebacic acid. The acyclic acid esters preferably are used in smaller proportions than those of the phthalic acid or aromatic type ester ingredients.

These linear copolyesters which can be considered as the reaction product of a glycol of the formula $$HO(CH_2)_nOH$$

wherein $n$ is an integer from 2 to 6 with terephthalic acid, isophthalic acid, and at least two acyclic dicarboxylic acids of the formula $HOOC—CH_2—X—CH_2—COOH$, where X is a linear chain of 2 to 8 atoms in the chain of which not more than two atoms may be oxygen atoms and the remaining atoms are hydrocarbon carbon atoms. These acyclic acids differ from each other by at least three atoms in the length of the linear chain, while the molar proportions of the acid components of said copolyester are within the following ranges:

| | Mol percent |
|---|---|
| Terephthalic acid | 20 to 60 |
| Isophthalic acid | 15 to 50 |
| Mixture of two acyclic dicarboxylic acids | 10 to 50 |

The molar ratio of one acyclic acid to the other is in the range of .5 to 2.0. The preferred acyclic dicarboxylic acids are sebacic acid and adipic acid.

Another component of applicant's composition involves a polycarbonate resin in a suitable solvent, such as ethylene dichloride, dioxane or the like, and combined with the copolyester ingredient named above. The polycarbonates, their preparation and properties are described on pages 112 to 115, British Plastics, March 1958.

In formulating the composition, according to the present invention, a mixture is formed of the copolyester ingredient and of the polycarbonate ingredient using a suitable co-solvent such as, for example, ethylene dichloride. This mixture is stirred until it becomes homogeneous. It may then be filtered through a pressure filter, for example, a "dope" filter, to obtain a smooth flowing composition. The viscosity of the solution when ready for application to the screen backing or support preferably will range from about 1300 to 1400 centistokes at 25° C. This composition is then applied to the base material, e.g. cloth, paper or the like, in a layer of smooth, uniform thickness, preferably by using a nip roll coater or a doctor blade coater. Any equivalent device can be used, however, providing it is suitable for coating materials of high viscosity smoothly onto supports such as paper or fabric or film. While paper and similar sheet fabric is mentioned as the preferred support, these adhesive materials also may be coated on relatively stiff paperboard or on plastic film base type materials. They may be placed also on non-flexible supports such as glass, or on rigid metal supports. They may be used on flexible metals, i.e., metal foil and the like.

The coating should be applied so as to have a thickness when dry between about 0.2 and 2 mils for most purposes. A thickness ranging between 0.5 and 1 mil is most preferred. However, for some particular purposes, the coating may be somewhat thinner or considerably thicker than the broader limits just mentioned.

In a particular application where the adhesive material was applied to a Bristol board of about 0.017 inch thickness, it was found that a wire side coating procedure offered not only the desired adhesive effects but also sealed the paper very well against penetration by moisture, solvents, etc. The coating thus applied to Bristol board made a very effective adhesive layer for the subsequent salt layer coating which was placed thereon. The particular salt layer coating of calcium tungstate and binder had special utility for making an intensifying screen. However, this intensifying layer is known in the art and forms no specific part of the present invention.

A typical salt layer composition may be made up of 10 lbs. of calcium tungstate, 56 ounces of a 17% by weight solution of polyvinyl acetate/polyvinyl chloride resin in an organic solvent, and a small amount of a plasticizer such as dioctyl phthalate or equivalent. It may be desirable to add a small amount of amyl acetate as a residuary solvent. As indicated above, other binders, plasticizers and solvents, and modifiers of various kinds, may be incorporated into the salt layer if desired.

In its broad terms, the present invention contemplates a novel adhesive material which includes, in combination, the following ingredients:

(A) A polycarbonate resin; and
(B) A copolyester formed from a plurality of dibasic acids, at least one, and preferably more than one of which is of the phthalate type. At least one, and preferably two of the dibasic acids should also be of the linear or acyclic type. These materials are dissolved in an organic solvent which is compatible with both, such as a chlorinated hydrocarbon, i.e., methylene chloride, ethylene dichloride, etc.

A specifically preferred composition comprises a combination of polycarbonate resin as one ingredient and a copolyester of the bis-ethylene glycol esters of terephthalic acid and isophthalic acid, combined with smaller proportions of the bis-ethylene glycol esters of two different acyclic acids such as adipic acid and sebacic acid. A very suitable copolyester composition for the second ingredient is made up of 20% by weight of each of the esters of the acyclic acids and the isophthalic acid ester, using 40% of the terephthalic acid ester. However, compositions employing equal parts by weight of the esters of the terephthalic acid and the isophthalic acid with smaller amounts of acyclic acid esters, are also very suitable.

The invention may be more fully understood by reference to the following specific example.

*Example 1*

A composition was prepared by dissolving 1.08 kilograms of a polycarbonate resin composed primarily of the reaction product of 4,4′-dihydroxy diphenyl propene and phosgene in 7.92 kilograms of ethylene dichloride. To this was added 2.54 kilograms of polyester adhesive. The latter comprised 17.5% of solids copolymerized from a predominant proportion of terephthalic and phthalic acid esters with smaller proportions of sebacic and adipic acid esters. The esterifying components in both cases were ethylene glycol and such are preferred, although monobasic alcohols can be used in some cases.

The composition material, prepared as above, was stirred to be smooth and homogenous. It was then filtered through a pressure filter and finally applied in a smooth uniform thickness coating to the Bristol board paper. As mentioned above, while Bristol board is particularly suitable, the adhesive is very suitable for thinner papers, cloths, and other fabrics. It also adheres well to film base.

Obvious variations may be made in the ingredients. It is intended that those which would occur to those skilled in the art be covered by the following claims so far as the prior art permits.

What is claimed is:

1. A fluorescent screen material comprising a base sheet, a layer of calcium tungstate salt in a water-insoluble resinous binder, and an adhesive layer holding permanently said salt layer to said base sheet and sealing said sheet against moisture vapors, said last mentioned layer consisting essentially of a mixture of (a) a polycarbonate resin and (b) a copolyester of an alkylene glycol having from 2 to 6 carbon atoms with a plurality of dibasic acids, at least one of which is a phthalic acid and at least two of which are acyclic acids having from 4 to 10 carbon atoms in a linear carbon chain linking the two carboxy groups.

2. A fluorescent screen material comprising a sheet of Bristol board, a layer of calcium tungstate in a water-insoluble resinous binder and an intermediate adhesive and sealing layer bonding said tungstate layer to said board consisting essentially of a mixture of (a) a polycarbonate resin adhesive and (b) a polyester adhesive consisting essentially of the ethylene glycol esters of a combination of terephthalic acid, isophthalic acid, and two different acyclic dicarboxylic acids, having a linear carbon chain of from 4 to 8 carbon atoms linking the two carboxy groups, said esters of acyclic dicarboxylic acids comprising from 10 to 50 mole percent of ingredient (b).

3. A screen material according to claim 1 wherein said resinous binder material is selected from the class consisting of polyvinyl acetate, polyvinyl chloride and the copolymers thereof.

4. A screen material according to claim 2 wherein said resinous binder material is selected from the class consisting of polyvinyl acetate, polyvinyl chloride and the copolymers thereof.

5. A fluorescent screen material according to claim 1 wherein said two acyclic dicarboxylic acids are sebacic acid and adipic acid.

6. A fluorescent screen material according to claim 2 wherein said two acyclic dicarboxylic acids are sebacic acid and adipic acid.

References Cited by the Examiner

UNITED STATES PATENTS

| | | | |
|---|---|---|---|
| 1,532,783 | 4/1925 | Sheppard et al. | 96—82 |
| 2,716,082 | 8/1955 | Smith | 96—82 |
| 3,000,849 | 9/1961 | Clachan et al. | 96—87 |
| 3,025,163 | 3/1962 | Ossenbrunner et al. | 96—87 |
| 3,117,046 | 1/1964 | Klockgether et al. | 96—87 |

FOREIGN PATENTS

| | | |
|---|---|---|
| 1,287,519 | 2/1962 | France. |
| 1,302,051 | 7/1962 | France. |

NORMAN G. TORCHIN, *Primary Examiner.*

A. LIBERMAN, *Assistant Examiner.*

Disclaimer 3,316,118.—*Peter A. Landskroener*, Binghamton, N.Y. MIXED RESIN ADHESIVE COMPOSITION FOR SECURING HYDROPHOBIC CALCIUM TUNGSTATE SALT LAYER TO HYDROPHILIC BASE. Patent dated Apr. 25, 1967. Disclaimer filed Sept. 30, 1982, by the assignee, *Eastman Kodak Co.*

Hereby enters this disclaimer to all claims of said patent.

[*Official Gazette April 5, 1983.*]